(12) United States Patent
Saito et al.

(10) Patent No.: US 11,069,452 B2
(45) Date of Patent: Jul. 20, 2021

(54) DRIVE DEVICE FOR IN-CORE NEUTRON INSTRUMENTATION SYSTEM

(71) Applicant: Mitsubishi Electric Corporation, Tokyo (JP)

(72) Inventors: Atsushi Saito, Tokyo (JP); Kazunori Aida, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 95 days.

(21) Appl. No.: 16/475,869

(22) PCT Filed: Feb. 23, 2017

(86) PCT No.: PCT/JP2017/006729
§ 371 (c)(1),
(2) Date: Jul. 3, 2019

(87) PCT Pub. No.: WO2018/154668
PCT Pub. Date: Aug. 30, 2018

(65) Prior Publication Data
US 2019/0378627 A1    Dec. 12, 2019

(51) Int. Cl.
*G21C 19/20* (2006.01)
*G21C 17/108* (2006.01)
(Continued)

(52) U.S. Cl.
CPC ............. *G21C 19/20* (2013.01); *F16P 3/08* (2013.01); *G21C 17/10* (2013.01); *G21C 17/108* (2013.01); *G21C 19/207* (2013.01); *G21C 13/02* (2013.01)

(58) Field of Classification Search
CPC .... G21C 17/108; G21C 17/10; G21C 17/112; G21C 17/116; G21C 17/12; G21C 17/14;
(Continued)

(56) References Cited

U.S. PATENT DOCUMENTS

| 5,870,317 A * | 2/1999 | Barnett ..................... G05B 9/02 703/6 |
| 9,943,003 B2 * | 4/2018 | Segroves ............. H05K 5/0213 |

(Continued)

FOREIGN PATENT DOCUMENTS

| CN | 107767976 B * | 7/2019 | ............. G21C 19/02 |
| DE | 102015113937 A1 * | 2/2017 | ............... G07C 3/00 |

(Continued)

OTHER PUBLICATIONS

Occupational Safety and Health Administration. OSHA Publication 3170, 2001. Safeguarding Equipment and Protecting Workers from Amputations., downloaded from URL, "https://www.scribd.com/document/170430576/Osha-3170" on Mar. 16, 2021. (Year: 2001).*

(Continued)

*Primary Examiner* — Darlene M Ritchie
(74) *Attorney, Agent, or Firm* — Buchanan Ingersoll & Rooney PC (57) ABSTRACT

A drive device for an in-core neutron instrumentation system includes a safety circuit between a power supply and a drive motor. The safety circuit is provided inside the cover member, and switches between a conductive state in which power can be supplied to the drive motor and a cut-off state in which power cannot be supplied thereto depending on a mounted state of the cover member. The safety circuit is controlled to be in the conductive state in response to a state in which the cover member is mounted on the base member, and is controlled to be in the cut-off state in response to a state in which the cover member is not mounted on the base member.

8 Claims, 9 Drawing Sheets

(51) Int. Cl.
*F16P 3/08* (2006.01)
*G21C 17/10* (2006.01)
*G21C 13/02* (2006.01)

(58) Field of Classification Search
CPC ...... G21C 19/20; G21C 19/207; G21C 19/10; G21C 19/00; G21C 19/02; G21C 19/105; G21C 19/11; G21C 19/115; G21C 19/202; G21C 19/205; G21C 19/22; G21C 19/24; G21C 19/06; G21C 19/065; G21C 13/02; F16P 3/08; F16P 1/02; Y02E 30/30
See application file for complete search history.

(56) References Cited

U.S. PATENT DOCUMENTS

| | | | |
|---|---|---|---|
| 2011/0074595 A1* | 3/2011 | Guo | G08B 21/185 340/687 |
| 2011/0168517 A1 | 7/2011 | Krieger et al. | |
| 2016/0073526 A1* | 3/2016 | Chen | F16B 12/46 312/283 |
| 2018/0187833 A1* | 7/2018 | Wind | B65H 19/126 |

FOREIGN PATENT DOCUMENTS

| | | |
|---|---|---|
| JP | S62142500 U | 9/1987 |
| JP | H02-271299 A | 11/1990 |
| JP | H07270580 A | 10/1995 |
| JP | 2000020174 A | 1/2000 |

OTHER PUBLICATIONS

International Search Report (PCT/ISA/210) dated May 16, 2017, by the Japanese Patent Office as the International Searching Authority for International Application No. PCT/JP2017/006729.
Written Opinion (PCT/ISA/237) dated May 16, 2017, by the Japanese Patent Office as the International Searching Authority for International Application No. PCT/JP2017/006729.
Extended European Search Report dated Dec. 4, 2019 for corresponding European patent application No. 17897470.5, 8 pages.

* cited by examiner

DRIVE DEVICE FOR IN-CORE NEUTRON INSTRUMENTATION SYSTEM

TECHNICAL FIELD

The present invention relates to a drive device for an in-core neutron instrumentation system, for driving a neutron detector of the in-core neutron instrumentation system for measuring neutrons in a reactor of a nuclear power plant.

BACKGROUND ART

The conventional drive device for the in-core neutron instrumentation system (hereinafter simply referred to as the drive device) includes a mechanism portion for winding/extending a cable having a neutron detector fixed at a tip end portion thereof as an internal component. The drive device used a snap lock for fixing an exterior cover member thereof. The snap lock is a fixing member which fixes the cover member to a device body side so that the cover member is not opened by turning a lever by hooking an opposite side member to one protrusion.

In the nuclear power plant, maintenance and inspection work is carried out approximately once a year. In the case where the cover member is fixed to the device body side by a method such as using the snap lock or a thumb screw, an operator can remove the cover member by a simple operation, access the internal component to perform maintenance work, and easily mount the cover member by a reverse procedure.

Here, the drive device is a drive mechanism portion for moving the neutron detector fixed to the cable tip end portion at high speed. Therefore, a component rotates at high speed in the drive device during operation, and the cable is in a state to be wound/extended at high speed. The neutron detector moves from a standby installation position (an arbitrary position outside the reactor in a reactor containment vessel) to inside the reactor which is a measuring position (a distance between the two points is about 40 to 50 m) at the maximum speed of 36.6 m/min.

In a conventional drive device, the drive device can be driven at high speed even when the cover member is opened. Therefore, for example, at the time of maintenance and inspection of the conventional drive device, there has been a risk that the operator directly contacts the internal component during operation, resulting in accidents such as injuries and electric shocks.

Further, as a conventional technique, a device for cutting and collecting the cable has been proposed for collecting the cable of the drive device for the in-core neutron instrumentation system. At the time of cable collection, the drive device is configured to cut and collect the cable in a state in which the cover member is removed (for example, see Patent Literature 1).

CITATION LIST

Patent Literature

Patent Literature 1: JP-A-7-270580

SUMMARY OF THE INVENTION

Technical Problem

Since the conventional drive device for the in-core neutron instrumentation system is configured as described above, it has been capable of supplying (inputting) power to a drive motor and operating the drive device even during inspection work with the cover member removed.

Therefore, there has been the risk that the operator contacts the internal component of the drive device which is energized. The risk of maintenance and inspection work such that the operator contacts a cable winding drum or the like to be caught or contacts a rotating gear or the like to be injured during operation of the drive device could not be ignored.

Further, the drive device ensures a driving force by the drive motor. Further, in the conventional drive device, since it was possible to feed power to the drive motor even when the cover member is opened, the risk of electric shock due to the operator touching a charging unit of a power supply circuit or the like during power supply could not be ignored.

The present invention has been made to solve the above problems, and an object of the present invention is to provide the drive device for the in-core neutron instrumentation system including a safety circuit for performing control to enable/disable power supply to the drive device for the in-core neutron instrumentation system depending on a mounted state of the cover member for covering the internal component of the drive device for the in-core neutron instrumentation system.

Solution to Problem

A drive device for an in-core neutron instrumentation system according to the present invention drives a neutron detector of the in-core neutron instrumentation system for measuring neutrons in a nuclear reactor. The drive device for the in-core neutron instrumentation system includes: a winding drum for winding a cable having the neutron detector mounted at a tip end portion thereof; a drive motor for driving the winding drum for winding/extending the cable; a base member on which the winding drum and the drive motor are mounted; a cover member mounted on the base member and housing the winding drum and the drive motor therein; and a safety circuit provided between a power supply of the drive motor and the drive motor, and for switching between a conductive state in which power can be supplied to the drive motor and a cut-off state in which power cannot be supplied thereto depending on a mounted state of the cover member.

Advantageous Effects of the Invention

With the drive device for the in-core neutron instrumentation system of the present invention, the safety circuit enables switching between the conductive state in which power can be supplied to the drive motor and the cut-off state in which power cannot be supplied depending on the mounted state of the cover member. Therefore, it is possible to supply power to the drive device for the in-core neutron instrumentation system only when the safety circuit is in the conductive state.

DESCRIPTION OF EMBODIMENTS

Embodiment 1

Hereinafter, a drive device for an in-core neutron instrumentation system according to Embodiment 1 of the present invention will be described with reference to FIGS. 1 to 5.

The in-core neutron instrumentation system for detecting neutron flux in a reactor is mainly constituted by a neutron detector, the drive device for the in-core neutron instrumentation system for driving the detector, and a control device for controlling them, and is supplied with power from an outside and operated.

Figure 1:
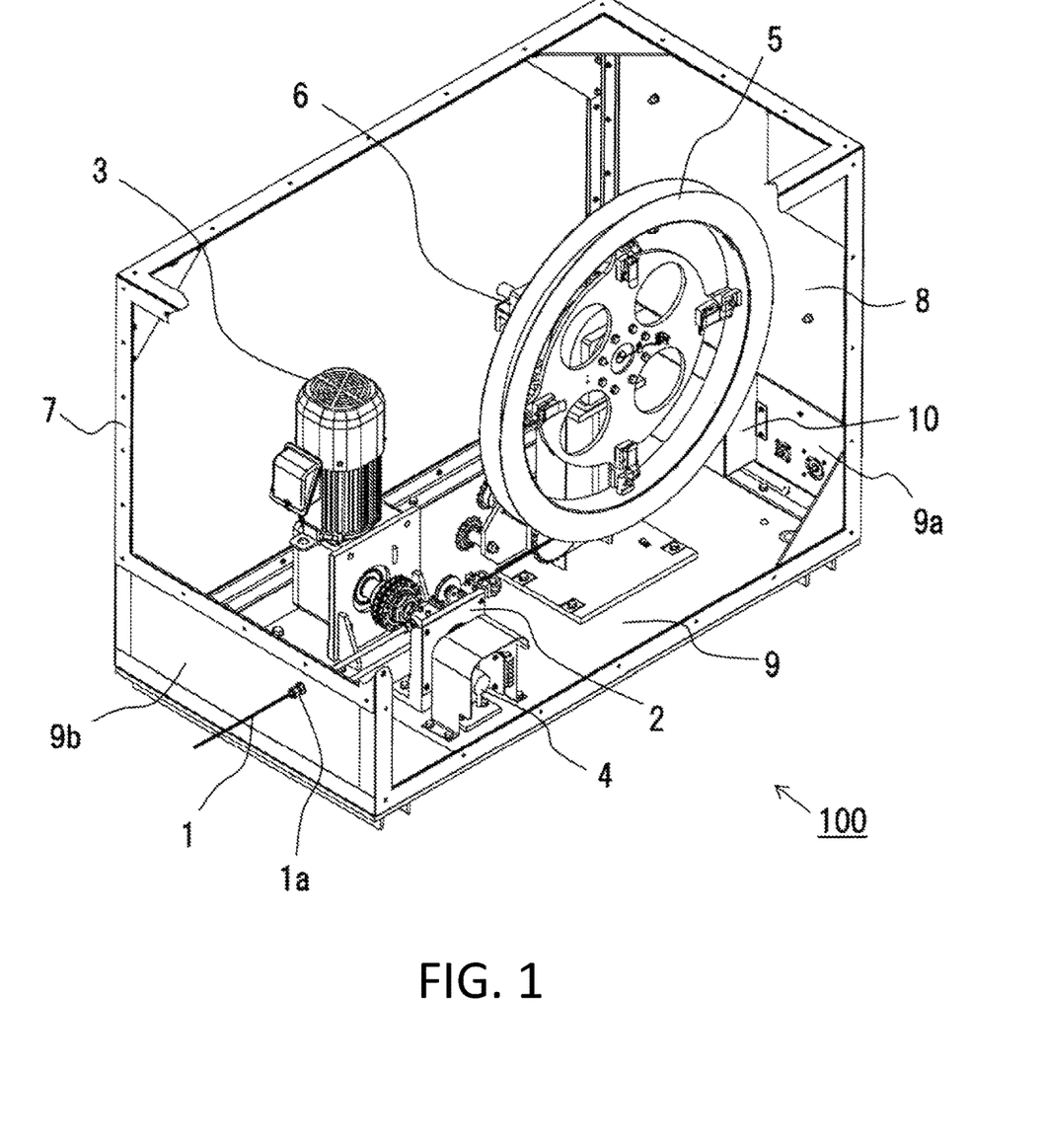
FIG. 1 is a perspective view showing a drive device for an in-core neutron instrumentation system according to Embodiment 1 of the present invention.

FIG. 1 is a perspective view showing an internal structure of a drive device 100 for the in-core neutron instrumentation system (hereinafter referred to as the drive device 100) according to Embodiment 1 of the present invention.

As shown in FIG. 1, the drive device 100 for moving a position of the neutron detector used for neutron measurement in a nuclear reactor of a nuclear power plant or the like is provided so that its external casing shape is, for example, a rectangular parallelepiped.

A base member 9 is provided as a base on which an internal component of the driving device is mounted. Panels (cover wall surface portions) are respectively provided so as to abut against four end sides of the base member 9 having a substantially square planar shape. A panel (cover upper surface portion) is provided also over a space surrounded by the cover wall surface portions of four surfaces. Here, the panels are referred to as a cover member 8 including the cover wall surface portions and the cover upper surface portion.

FIG. 1 shows a state in which two front side portions of the four cover wall surface portions, and the cover upper surface portion constituting the cover member 8 are removed to expose the internal component.

Further, as shown in FIG. 1, a drive cable 1 (drive cable) is in a state of being drawn out from a cable lead-out portion 1a of the drive device 100. The neutron detector (not shown) is attached to a tip end portion of the cable 1.

In order to move the neutron detector to an arbitrary position in the nuclear reactor, the following components necessary for winding/extending the cable 1 are mounted on a mounting surface of the base member 9.

A drive wheel 2 is a rotating body which meshes with the cable 1, and allows the cable 1 to move back and forth according to its rotational direction.

A drive motor 3 converts electric power into power to drive a rotating shaft and rotates the drive wheel 2 interlocked with the rotating shaft.

A brushless resolver 4 meshes with the drive wheel 2 by a gear and detects a rotation angle of the drive wheel 2 to measure a moving distance of the cable 1.

A winding drum 5 is a rotating body connected to the drive wheel 2 via a chain, and is a structure driven by the drive motor 3 in conjunction with the drive wheel 2 to wind the cable 1.

A buffer coupling 6 is attached to the winding drum 5 and keeps the cable 1 stretched tight by always applying a constant tension in a direction opposite to an operation direction of the cable 1 by a restoring force of a spring, to prevent the cable 1 from being winded in disorder. The buffer coupling 6 is disclosed in detail in JP-A-1-185489, JP-A-1-185490 and the like.

A frame 7 is a member for fixing end portions of the panels constituting the cover member 8. The frame 7 is provided in an abutting region between two adjacent cover wall surface portions, in an abutting region between the cover wall surface portion and the cover upper surface portion, and in an abutting region between the cover wall surface portion and the base member 9, to hold the cover wall surface portions and the cover upper surface portion.

The cover member 8 is an exterior casing including the cover wall surface portions mounted on the base member 9, surrounding a periphery of the base member 9, and extending upwardly, and the cover upper surface portion for covering a component mounting space over the base member 9 surrounded by the cover wall surface portions. For example, the cover member 8 is not a component affecting an operation itself of a drive device body, but is used as a protective material for protecting the internal component and protecting an operator performing maintenance and inspection.

As described above, the base member 9 is a substantially flat plate-like member including the mounting surface for mounting the internal component of the drive device 100. For example, the base member 9 includes, as components, a rising surface portion 9a for fixing a safety circuit 10 described later and located at the other side surface lower portion of the exterior casing, and a rising surface portion 9b provided with the cable lead-out portion 1a for withdrawing the cable 1 and located at one side surface lower portion of the exterior casing. As described above, the base member 9 has a structure on which a functional portion of the drive device body is mounted.

The safety circuit 10 incorporated in a power supply circuit of the drive motor 3 and for switching power supply enable/disable state to the drive motor 3 in combination with one surface of the cover member 8 is mounted on the drive device 100.

The safety circuit 10 is a component serving as a main portion of the present invention, and has a sensor unit (described later) fixed to the base member 9 side (device body side) and detecting whether the cover member 8 is mounted on the device body side.

The safety circuit 10 includes a circuit unit for switching to a conductive state in which power can be supplied to the drive motor 3 when the cover member 8 is mounted, and for switching to a cut-off state in which power is cut off to the drive motor 3 when the cover member 8 is not mounted, in response to a detection result of the sensor unit.

Even if the safety circuit 10 is in the conductive state, when power is not supplied from a power supply or when an operation of the drive device 100 is not allowed (in the case of OFF), power is not supplied to the drive motor 3.

Further, if the safety circuit 10 is in the cut-off state, even if power is supplied from the power supply or even if the operation of the drive device 100 is allowed (in the case of ON), it goes without saying that power is not supplied to the drive motor 3.

An example shown in FIG. 1 shows a state in which the safety circuit 10 is provided on the rising surface portion 9a and the cable lead-out portion 1a is provided on the rising surface portion 9b. However, both of the cable lead-out portion 1a and the safety circuit 10 can be provided on either one of the rising surface portions 9a and 9b, and it is possible to arrange placement of each component in a range that does not impair its function.

Although main structural elements of the drive device 100 according to Embodiment 1 of the present invention have been described above, it goes without saying that there are cases where a component for assisting these functions or a component for adding another function is mounted thereon.

Figure 2:
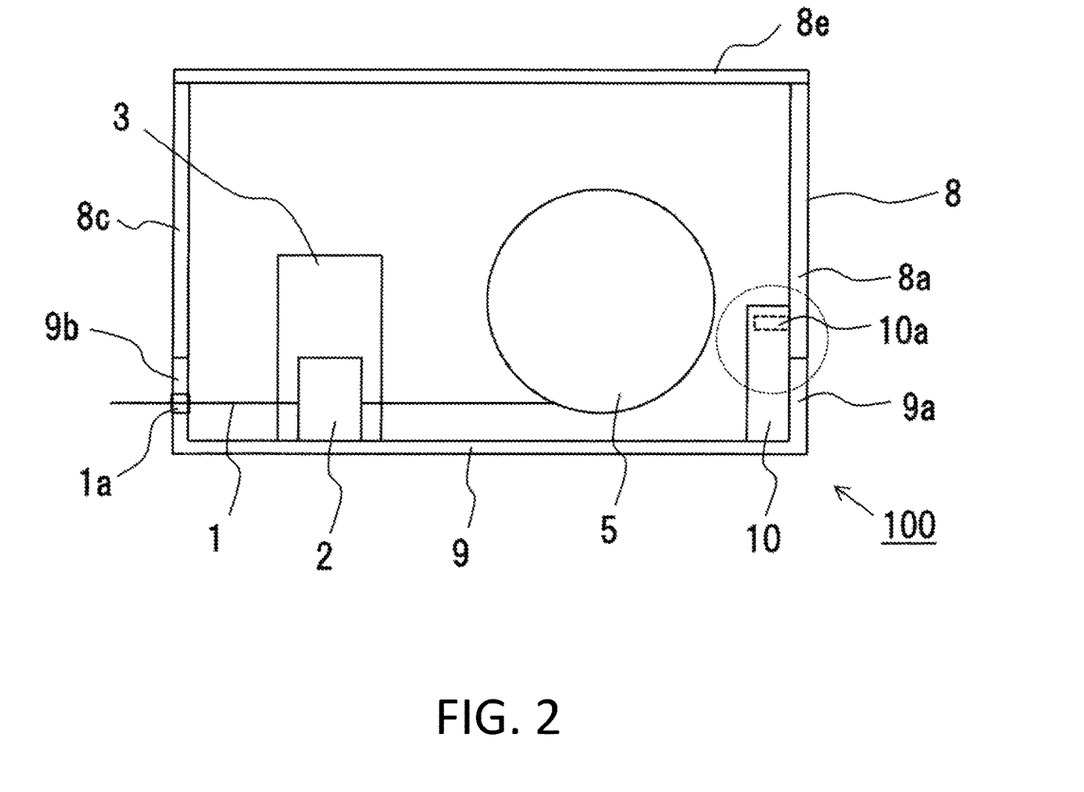
FIG. 2 is a side cross-sectional view showing the drive device for the in-core neutron instrumentation system according to Embodiment 1 of the present invention.

FIG. 2 shows a side cross-sectional view (schematic view) in an extending direction of the cable 1 of the drive device 100. As shown in FIG. 2, the base member 9 includes rising surface portions 9a and 9b rising perpendicular to a cable extending direction at both end portions in the cable extending direction of a mounting surface portion serving as the base portion. Cover wall surface portions 8a and 8c are respectively arranged to abut against upper portions of the rising surface portions 9a and 9b via the frame 7 (not shown).

Here, the safety circuit 10 is fixed to the rising surface portion 9a at one end of the base member 9, and includes a sensor unit 10a. The sensor unit 10a is a component for detecting whether the cover member 8 is mounted on the base member 9 side. As a detection method by the sensor unit 10a, it is possible to adopt various methods such as a method of detecting a mounted state by contacting a part of the sensor unit 10a with the cover member 8 which is an object to be detected, and a method of detecting the mounted state by closing of a lighting window by mounting of the cover member 8 by using a light detection unit.

Incidentally, the rising surface portions 9a and 9b can be formed integrally with the frame 7 which is a frame body for mounting the cover member 8 thereon.

It is sufficient that the safety circuit 10 is fixed to a portion which is not removed from the device body side of the drive device 100, and it may be fixedly used on the frame 7.

Next, the operation of the drive device 100 according to Embodiment 1 of the present invention will be described. In FIG. 1, the drive motor 3 is supplied with power from an external power supply, and can be operated, for example, under four conditions of forward rotation, reverse rotation, high speed, and low speed. As described above, rotational motion of the drive motor 3 is transmitted to the drive wheel 2 connected to the drive motor 3, and the winding drum 5 by the shaft, and the drive wheel 2 and the winding drum 5 synchronously rotate with the drive motor 3.

Here, the drive wheel 2 is provided with a spiral groove on its outer periphery. The groove of the drive wheel 2 meshes with a spiral structure of the outer periphery of the cable 1 wound on the winding drum 5, so that the cable 1 can be operated at a rotational speed of the drive motor 3 in a rotational direction of the drive motor 3.

Figure 3:
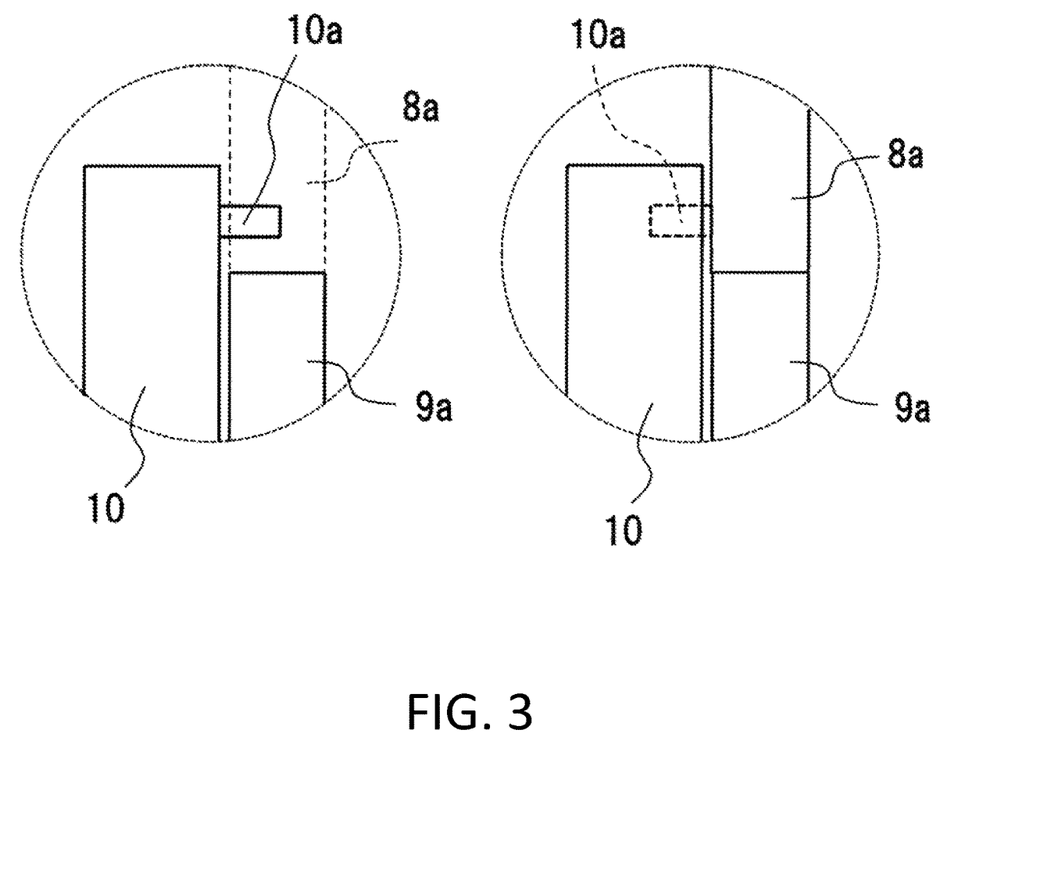
FIG. 3 is an enlarged view of a main part showing a safety circuit of the drive device for the in-core neutron instrumentation system according to Embodiment 1 of the present invention.

FIG. 3 shows an enlarged view of a main part of the safety circuit 10. FIG. 3 corresponds to the safety circuit 10 and its peripheral components surrounded by a dashed line in FIG. 2. As described above, as a structure of the sensor unit 10a which detects whether the cover member 8 is mounted, various types of configurations can be conceived. Here, a case where the detection is performed based on a projection state of a protuberance pressed against the object (cover member 8) to be detected will be exemplified.

A diagram on the left side of FIG. 3 shows a state in which the cover wall surface portion 8a of the cover member 8 is not mounted on the base member 9 side. At this time, since the cover wall surface portion 8a to be detected is not present, the sensor unit 10a (protuberance) of the safety circuit 10 is in a state of largely protruding from a body portion of the safety circuit 10, for example, in a state where a tip end of the protuberance projects to above the rising surface portion 9a of the base member 9. At this time, it is controlled to the cut-off state in which power cannot be supplied to the drive motor 3, in the safety circuit 10 in response to the state in which the cover wall surface portion 8a is not mounted.

A diagram on the right side of FIG. 3 shows a state in which the cover wall surface portion 8a of the cover member 8 is mounted on the base member 9 side. At this time, since the cover wall surface portion 8a to be detected is present, the sensor unit 10a (protuberance) of the safety circuit 10 is in a state of hitting an inner wall of the cover wall surface portion 8a and being pushed back to the body portion side of the safety circuit 10. At this time, it is controlled to the conductive state in which power can be supplied to the drive motor 3, in the safety circuit 10 in response to the state in which the cover wall surface portion 8a is mounted.

Figure 4:
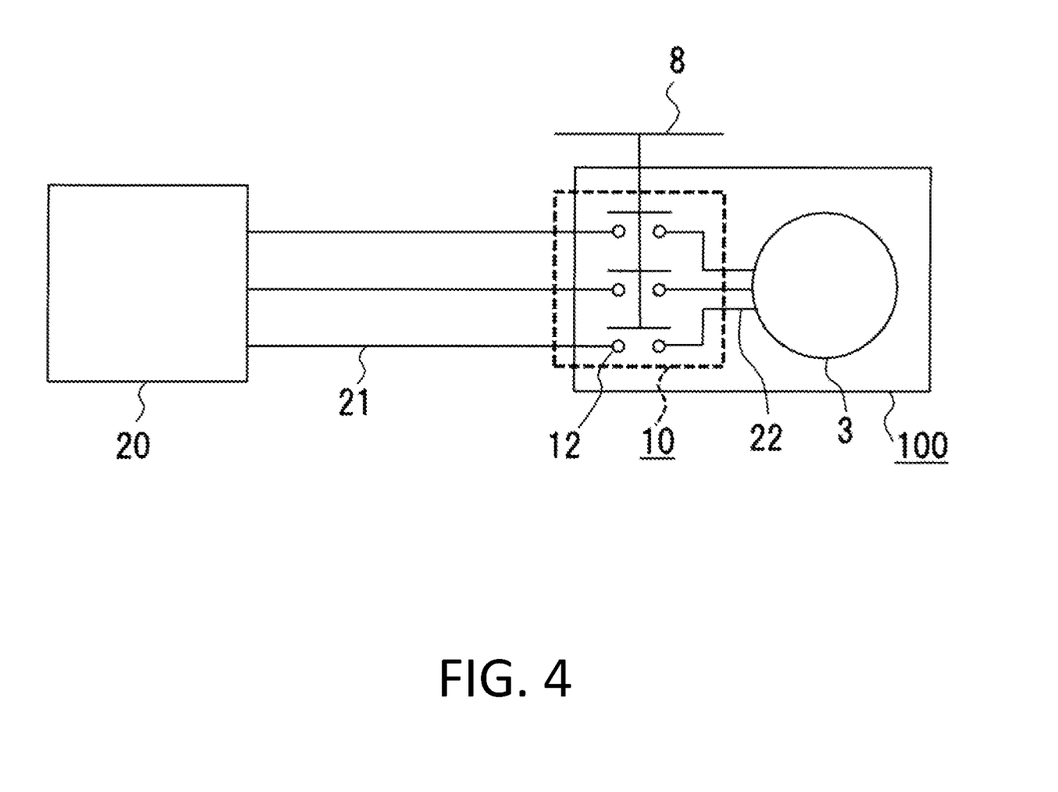
FIG. 4 is a configuration diagram showing the safety circuit of the drive device for the in-core neutron instrumentation system according to Embodiment 1 of the present invention.

FIG. 4 shows a configuration diagram of the safety circuit 10 included in the drive device 100 according to Embodiment 1 of the present invention. FIG. 4 schematically shows the power supply circuit for supplying power to the drive motor 3, and the safety circuit 10 is provided in the circuit.

As shown in FIG. 4, the safety circuit 10 is connected to an external power supply 20 via wiring 21, and the safety circuit 10 and the drive motor 3 are connected via wiring 22. Three wirings are shown corresponding to the fact that the power supply 20 is a three-phase AC power supply, however, it is also possible to arrange these three wires to be switched on and off collectively.

The safety circuit 10 has a microswitch 12 (for example, corresponding to the sensor unit 10a exemplified in FIG. 3) which is operated only when the cover wall surface portion 8a constituting one surface of the cover member 8 is mounted on the device body side. When the cover member 8 (cover wall surface portion 8a) is mounted on the base member 9 on the device body side, the safety circuit 10 allows the power supply 20 to supply power to the drive motor 3. At this time, in the operation of the microswitch 12, only the mounted state (mounted or not mounted) of the cover member 8 is a determination condition. Here, in the present invention, a special circuit such as a power supply monitoring circuit, and a control device are not required to determine whether power can be supplied to the drive device 100.

Figure 5:
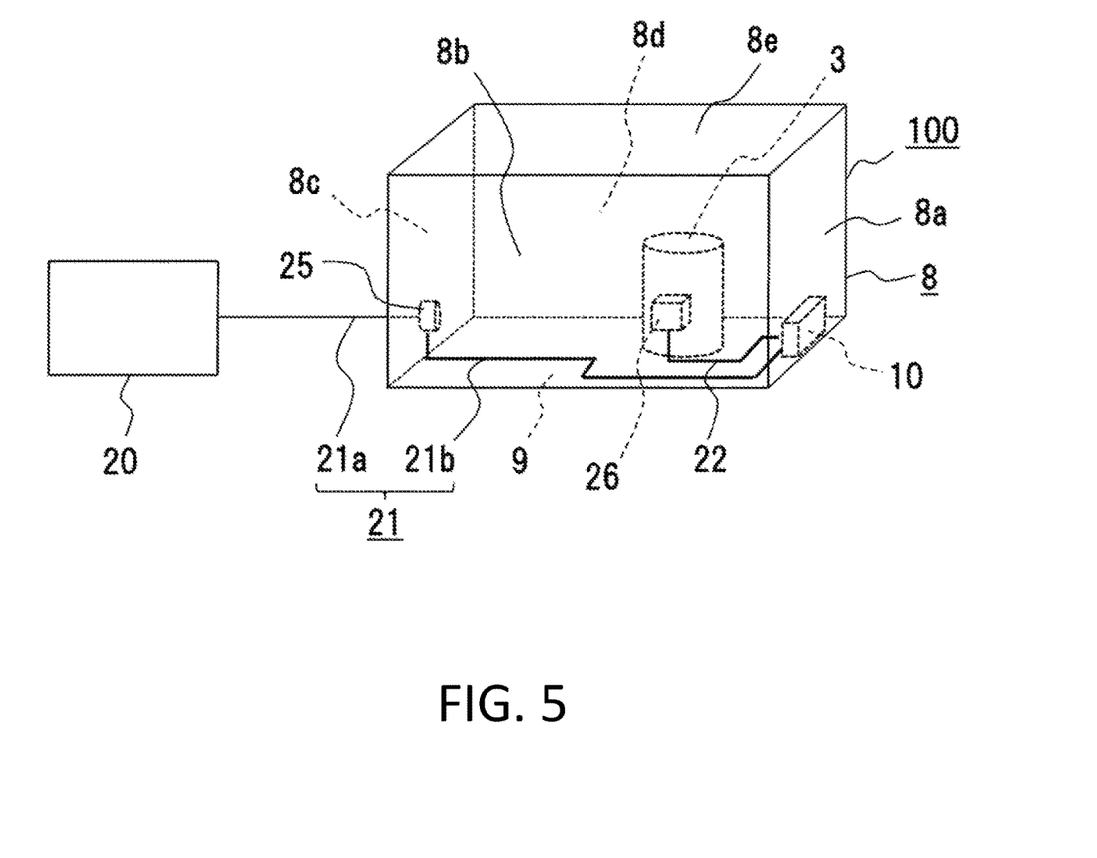
FIG. 5 is a configuration diagram showing the drive device for the in-core neutron instrumentation system according to Embodiment 1 of the present invention.

FIG. 5 is a schematic diagram showing the drive device 100, shows an example of arrangement of cover wall surface portions 8a, 8b, 8c, 8d and a cover upper surface portion 8e constituting the cover member 8, and shows a connection state of wiring and the like from the power supply 20 to the drive motor 3.

As shown in FIG. 5, the power supply 20 and the drive device 100 are connected by a wiring 21*a*. Then, the wiring 21*a* is drawn into the casing via a connector 25 from one surface of the cover member 8, and is connected to the safety circuit 10 via a wiring 21*b* applied to an inner surface of the cover member 8 or the base member 9. Then, it is connected to a drive motor terminal box 26 of the drive motor 3 via the microswitch 12 and the wiring 22 in the safety circuit 10, and reaches the drive motor 3. FIG. 5 shows an example in which the connector 25 is disposed on the cover wall surface portion 8*c*, however, the present invention is not limited thereto.

As described above, in the drive device 100 according to Embodiment 1 of the present invention having the safety circuit 10, when the cover member 8 is not mounted on the device body side, the power supply circuit is controlled to be cut off so that power cannot be supplied to the drive motor 3. Thus, at the time of maintenance and inspection, the safety circuit 10 is switched to the cut-off state at a stage of removing the cover member 8. Therefore, the operator can safely perform maintenance work of the drive device 100 while avoiding risks such as contact and winding to an operation portion, and electric shock. Further, when the drive device 100 is in operation, since the cover member 8 is in the mounted state, it is possible to protect an interior of the drive device 100, thereby securing a stable operation state.

Embodiment 2

In the above-described Embodiment 1, it has been described that it is controlled to switch whether to supply power to the drive motor 3 using the mounted state (mounting/unmounting) of the cover member 8 as the determination condition in the safety circuit 10. However, when the cover member 8 is composed of a plurality of panels and removal order of the plurality of panels is not restricted, the motor 3 is controlled regardless of the mounted state for panels which are not detected to be mounted/dismounted by the safety circuit 10.

Therefore, in Embodiment 2, the drive device 100, which enables power supply from the drive motor 3 in response to the mounted state of all the panels (cover wall surface portions 8*a*, 8*b*, 8*c*, 8*d* and the cover upper surface portion 8*e*) constituting the cover member 8 on the device body side (base member 9 side), will be introduced.

Figure 6:
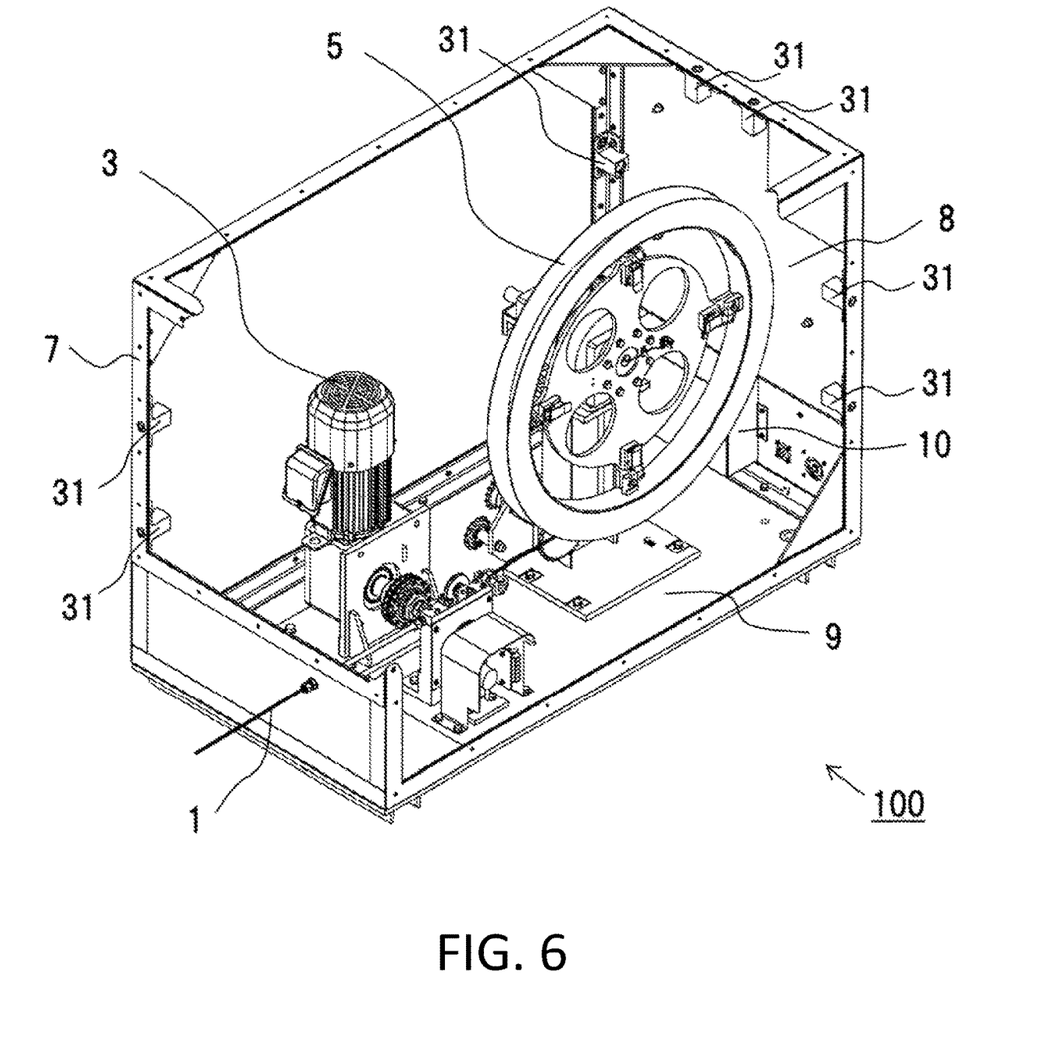
FIG. 6 is a perspective view showing the drive device for the in-core neutron instrumentation system according to Embodiment 2 of the present invention.

The drive device 100 according to Embodiment 2 will be described with reference to FIGS. 6 to 8. FIG. 6 is a perspective view of the drive device 100 according to Embodiment 2, and is characterized in that cover locking mechanism portions 31 for defining a panel mounting order of the cover member 8 composed of a plurality of parts is added, in contrast to the configuration shown in Embodiment 1.

A body of the cover locking mechanism portion 31 is fixed inside the frame 7 and is provided at a position accessible from two adjacent surfaces of the cover member 8. One cover locking mechanism portion 31 defines the order of mounting and dismounting of two adjacent (abuttingly arranged) panels. Then, by adjusting arrangement of the cover locking mechanism portions 31 so that any one of the cover locking mechanism portions 31 distributed in the frame 7 has access from all the panels, the order of mounting and dismounting of all the panels can be restricted. Therefore, it is possible to allow the plurality of panels which is the cover member 8 to be mounted and dismounted according to a restricted order, and to prohibit mounting and dismounting in other than the restricted order.

Figure 7:
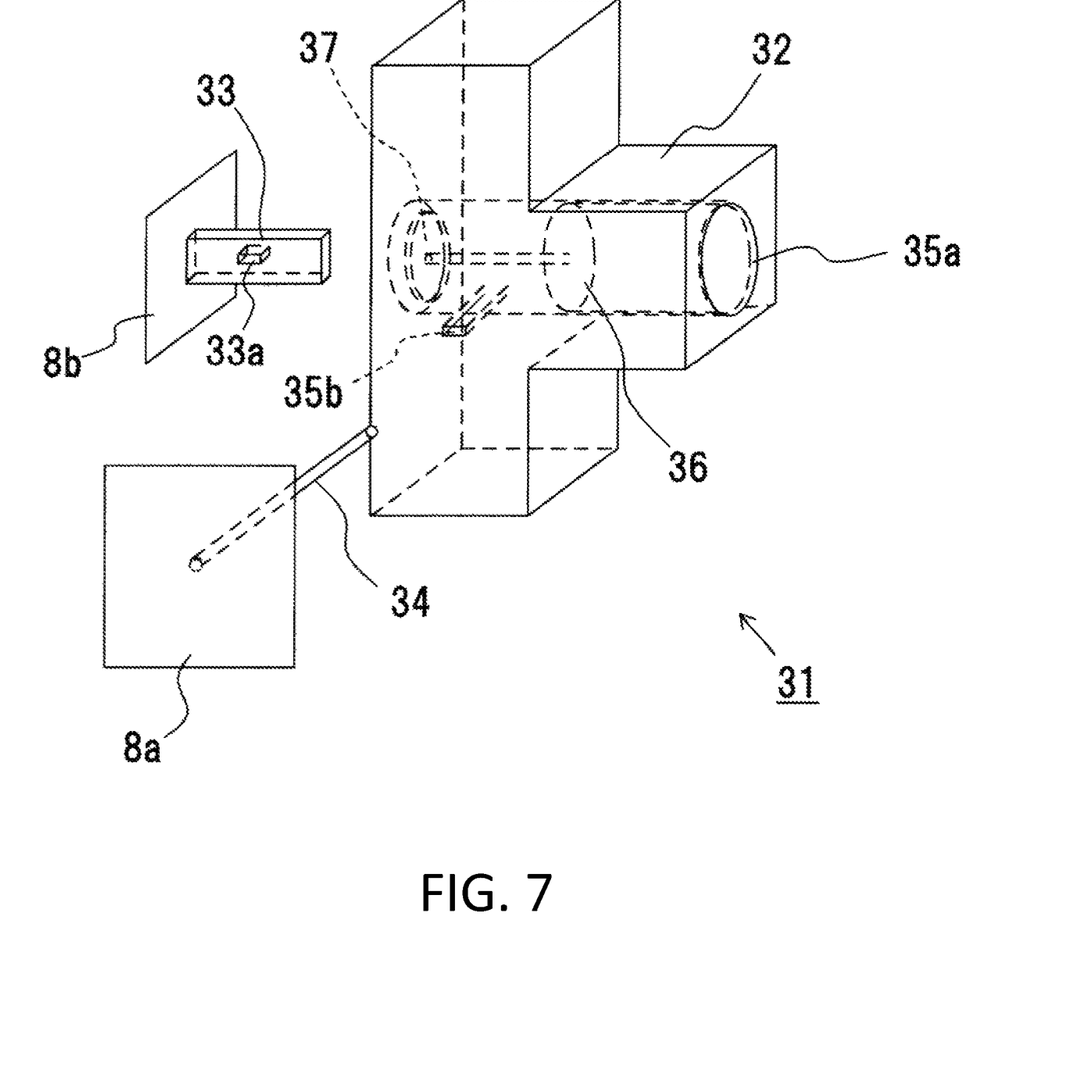
FIG. 7 is an exploded perspective view of a cover locking mechanism portion of the drive device for the in-core neutron instrumentation system according to Embodiment 2 of the present invention.

FIG. 7 is an exploded perspective view of one cover locking mechanism portion 31, and shows an example of a shape of each portion. The cover locking mechanism portion 31 includes as components a body portion 32 mounted inside the frame 7, a first fitting pin 33 mounted on one panel of the cover member 8, for example, to an inner surface side contacting the frame 7 of the cover wall surface portion 8*b*, and a second fitting pin 34 mounted on an inner surface side contacting the frame 7 of the cover wall surface portion 8*a* adjacent to the cover wall surface portion 8*b*.

The body portion 32 of the cover locking mechanism portion 31 has a plunger 36 disposed therein, and has an opening portion 35*a* for the plunger 36 to reciprocate linearly (for example, sliding movement or compression/decompression) in response to a pressing force from outside (the cover wall surface portion 8*b*). One end portion of the plunger 36 has a pressing plate 37 against which the first fitting pin 33 is pressed.

The body portion 32 of the cover locking mechanism portion 31 is fixed so that a mounting surface portion on a side where the pressing plate 37 is provided is in contact with an inner surface side of the frame 7. An opening portion is provided in the frame 7, which enables access to the pressing plate 37 from the outside.

As shown in FIG. 7, the first fitting pin 33 fixed to project perpendicularly to a surface portion of the cover wall surface portion 8*b* is inserted into the body portion 32 by mounting the cover wall surface portion 8*b* on the frame 7, and moves the plunger 36 by pushing the pressing plate 37 to a back side of the opening portion 35*a*. The first fitting pin 33 is provided with a through-hole 33*a* through which the second fitting pin 34 is inserted.

Further, the second fitting pin 34 fixed to project perpendicularly to a surface portion of the cover wall surface portion 8*a* is, for example, a member formed in a bar shape and machined to a size that can be inserted into the through-hole 33*a* of the first fitting pin 33. The second fitting pin 34 is inserted into an opening portion 35*b* connected to the opening portion 35*a* in the body portion 32 by mounting the cover wall surface portion 8*a* on the frame 7, and inserted into the through-hole 33*a* of the first fitting pin 33 in the opening portion 35*a* of the body portion 32, so that the first fitting pin 33 and the second fitting pin 34 are perpendicular to each other.

Figure 8:
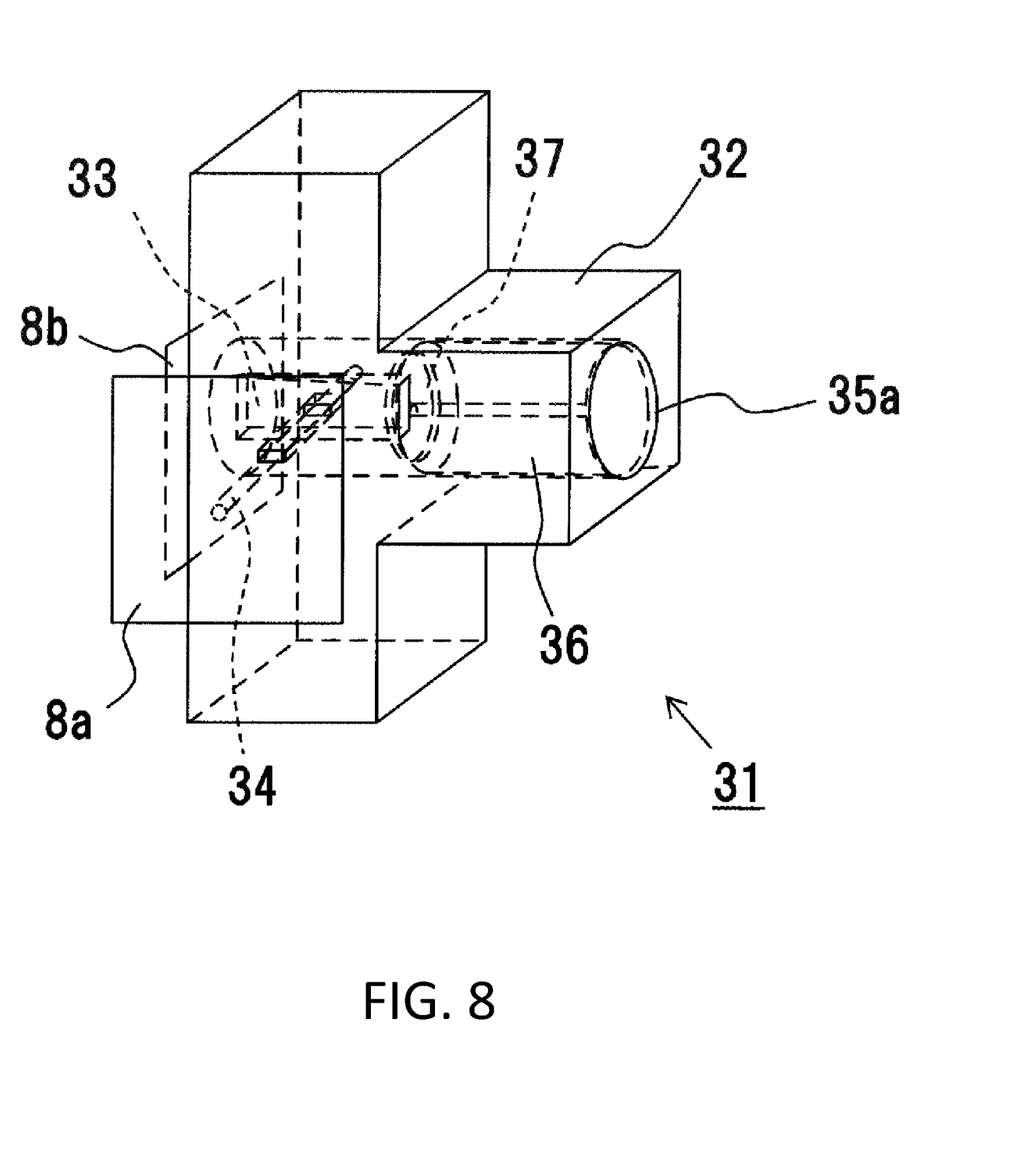
FIG. 8 is a perspective view of the cover locking mechanism portion of the drive device for the in-core neutron instrumentation system according to Embodiment 2 of the present invention.

FIG. 8 shows a configuration diagram of the cover locking mechanism portion 31 when both the cover wall surface portions 8*a*, 8*b* are mounted on the body portion 32 of the cover locking mechanism portion 31 fixed to the frame 7 (not shown). As described above, in the present configuration, when the cover wall surface portion 8*a* is mounted after the cover wall surface portion 8*b* is mounted, it is possible to obtain a fitted state as shown in FIG. 8. Then, by removing the cover wall surface portion 8*b* after removing the cover wall surface portion 8*a* from a panel mounted state of FIG. 8, it is possible to restore a panel unmounted state shown in FIG. 7.

When mounting the cover member 8, it is possible for the cover locking mechanism portion 31 having such a configuration to perform an operation in a manner that allows the cover wall surface portion 8*b* including the first fitting pin 33 to be first mounted on the frame 7, and then allows the cover wall surface portion 8*a* including the second fitting pin 34 to be next mounted on the frame 7. However, if the mounting is performed in the reverse order, since there is a problem that the second fitting pin 34 interferes with the plunger 36 or the first fitting pin 33 interferes with the second fitting pin 34, both the cover wall portions 8a and 8b cannot be mounted.

When the cover member 8 is dismounted, it is possible to perform the operation in a manner of first removing the cover wall surface portion 8a including the second fitting pin 34, and next removing the cover wall surface portion 8b including the first fitting pin 33 from the frame 7. However, if the removal is performed in the reverse order, since the first fitting pin 33 in a state where the second fitting pin 34 is inserted through the through-hole 33a cannot be pulled out from the body portion 32, the cover wall surface portion 8b cannot be first removed from the device body portion.

In this manner, by arranging the plurality of cover locking mechanism portions 31 in consideration of the mounting order of the plurality of parts constituting the cover member 8 with respect to the frame 7 of the drive device 100, it is possible to restrict the order of mounting so that the panel to be detected by the safety circuit 10 is finally mounted on the device body side. As a result, even in the case where the number of the safety circuits 10 is one, it is possible to control to the conductive state in which power can be supplied from the power supply only in a closed state in which all the panels of the cover member 8 are mounted.

Then, since the panels can be removed only in the reverse order of the mounting order, and removals in other orders are prohibited, when removing the cover member 8, the panel to be detected by the safety circuit 10 is first removed from the device body side, and it is possible to ensure safety of the operator.

In this manner, even in the case where one safety circuit 10 is disposed for the drive device 100, it is possible to ensure safety of the operator during maintenance and inspection by restricting the order of mounting each panel of the cover member 8. In addition, since the power supply to the drive motor 3 is allowed only when all the panels constituting the cover member 8 are mounted, it is also possible to ensure a safe operation state of the drive device 100.

Embodiment 3

In the above-described Embodiment 1, the safety circuit 10 is configured such that only the cover wall surface portion 8a (one surface) constituting the cover member 8 is a target of detection, and is configured to be interlocked only with the mounted state of the cover wall surface portion 8a. In the above-described Embodiment 2, the safety circuit 10 is combined with the plurality of cover locking mechanism portions 31 to restrict the panel mounting order, so that one safe circuit 10 switches power supply enable/disable state to the drive motor 3.

In contrast, in the drive device 100 according to Embodiment 3 of the present invention, safety circuits 10 (single safety circuit, series circuit) corresponding to the number of panels are respectively provided to be allocated to the panels so that each panel constituting the cover member 8 is to be detected, and control is performed using a safety circuit 50 (comprehensive safety circuit) connected in series.

Figure 9:
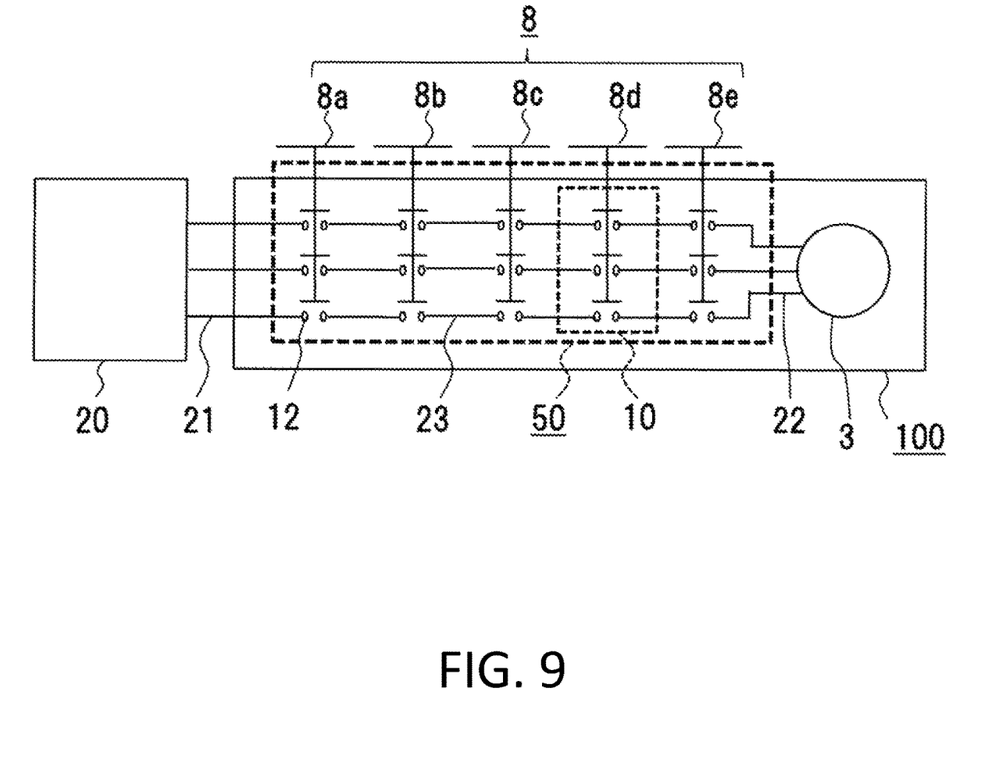
FIG. 9 is a configuration diagram showing the safety circuit of the drive device for the in-core neutron instrumentation system according to Embodiment 3 of the present invention.

FIG. 9 is a configuration diagram showing the safety circuit 50 of the drive device 100 according to Embodiment 3. The microswitches 12 for cutting off the power supply circuit of the drive motor 3 are respectively provided on the surfaces of the cover wall surface portions 8a, 8b, 8c, 8d and the cover upper surface portion 8e constituting the cover member 8. That is, the surfaces of the cover wall surface portions 8a, 8b, 8c, 8d and the cover upper surface portion 8e are objects to be detected by the single safety circuit 10. Here, a total of five safety circuits 10 are connected in series by wiring 23 so that a comprehensive safety circuit 50 is constructed.

The safety circuit 50 including this series circuit is controlled to be in the conductive state in response to all the panels constituting the cover member 8 being mounted on the device body side.

Since the safety circuits 10 are arranged in series, when any one of the safety circuits 10 detects the unmounted state of the cover member 8 to be detected, even if the other safety circuits 10 detect the mounted state, it is switched to the cut-off state by the comprehensive safety circuit 50, and power supply to the drive motor 3 is prohibited.

Therefore, by providing the safety circuit 50, it is possible to obtain the drive device 100 with high safety capable of driving the drive motor 3 in response to all the panels of the cover member 8 being mounted.

In the above-described Embodiment 1, the drive device 100 in which one safety circuit 10 having only one cover wall surface portion 8a to be detected in the cover member 8 including the plurality of panels is provided is exemplified. However, for example, it goes without saying that it is possible to obtain the drive device 100 with higher safety by respectively providing the safety circuits 10 for the plurality of panels (not all) constituting the cover member 8, to provide the safety circuits 10 in series, and by combining the cover locking mechanism portion 31 in Embodiment 2.

Note that in the present invention, it is possible to freely combine each embodiment, or to deform or omit each embodiment as appropriate within the scope of the invention.

The invention claimed is:

1. A drive device for an in-core neutron instrumentation system, the drive device driving a neutron detector of the in-core neutron instrumentation system for measuring neutrons in a nuclear reactor, comprising:
    a winding drum for winding a cable having the neutron detector mounted at a tip end portion thereof;
    a drive motor for driving the winding drum for winding/extending the cable;
    a base member on which the winding drum and the drive motor are mounted;
    a cover member mounted on the base member and housing the winding drum and the drive motor therein; and
    a safety circuit provided between a power supply of the drive motor and the drive motor, and for switching between a conductive state in which power can be supplied to the drive motor and a cut-off state in which power cannot be supplied thereto depending on a mounted state of the cover member,
    wherein the cover member comprises a plurality of cover wall surface portions surrounding a periphery of the base member, and is equipped with a cover locking mechanism portion for defining an order of mounting the cover wall surface portions on the base member, and wherein
    the safety circuit is provided on one of the plurality of cover wall surface portions, and
    the cover locking mechanism portion is provided so that the one cover wall surface portion on which the safety circuit is provided is finally mounted in the order of mounting the plurality of cover wall surface portions on the base member.

2. The drive device for the in-core neutron instrumentation system according to claim 1, wherein the safety circuit is controlled to be in the conductive state in response to a state in which the cover member is mounted on the base member, and is controlled to be in the cut-off state in response to a state in which the cover member is not mounted on the base member.

3. The drive device for the in-core neutron instrumentation system according to claim 1, wherein
the cover member comprises a cover upper surface portion for covering an upper portion of a space surrounded by the plurality of cover wall surface portions,
the cover wall surface portions and the cover upper surface portion are held by a frame which is fixed to the base member and provided in abutting regions between adjacent two of the cover wall surface portions and in abutting regions between the cover wall surface portions and the cover upper surface portion, and
the cover locking mechanism portion is mounted on the frame.

4. The drive device for the in-core neutron instrumentation system according to claim 1, wherein
the cover member comprises a cover upper surface portion for covering an upper portion of a space surrounded by the plurality of cover wall surface portions, and
the safety circuit is configured to include a series circuit which is brought into the conductive state in response to the whole cover member being mounted on the base member.

5. A drive device for an in-core neutron instrumentation system, the drive device driving a neutron detector of the in-core neutron instrumentation system for measuring neutrons in a nuclear reactor, comprising:
a winding drum for winding a cable having the neutron detector mounted at a tip end portion thereof;
a drive motor for driving the winding drum for winding/extending the cable;
a base member on which the winding drum and the drive motor are mounted;
a cover member mounted on the base member and housing the winding drum and the drive motor therein; and
a safety circuit provided between a power supply of the drive motor and the drive motor, and for switching between a conductive state in which power can be supplied to the drive motor and a cut-off state in which power cannot be supplied thereto depending on a mounted state of the cover member,
wherein the cover member comprises a plurality of cover wall surface portions surrounding a periphery of the base member, and is equipped with a cover locking mechanism portion for defining an order of mounting the cover wall surface portions on the base member, and wherein
the safety circuit is provided on one of the plurality of cover wall surface portions, and
the cover locking mechanism portion is provided so that the one cover wall surface portion on which the safety circuit is provided is first removed in an order of removing the plurality of cover wall surface portions from the base member.

6. The drive device for the in-core neutron instrumentation system according to claim 5, wherein the safety circuit is controlled to be in the conductive state in response to a state in which the cover member is mounted on the base member, and is controlled to be in the cut-off state in response to a state in which the cover member is not mounted on the base member.

7. The drive device for the in-core neutron instrumentation system according to claim 5, wherein
the cover member comprises a cover upper surface portion for covering an upper portion of a space surrounded by the plurality of cover wall surface portions,
the cover wall surface portions and the cover upper surface portion are held by a frame which is fixed to the base member and provided in abutting regions between adjacent two of the cover wall surface portions and in abutting regions between the cover wall surface portions and the cover upper surface portion, and
the cover locking mechanism portion is mounted on the frame.

8. The drive device for the in-core neutron instrumentation system according to claim 5, wherein
the cover member comprises a cover upper surface portion for covering an upper portion of a space surrounded by the plurality of cover wall surface portions, and
the safety circuit is configured to include a series circuit which is brought into the conductive state in response to the whole cover member being mounted on the base member.

* * * * *